United States Patent
Jain et al.

(10) Patent No.: US 12,423,392 B2
(45) Date of Patent: Sep. 23, 2025

(54) SECURE TOKEN FOR SCREEN SHARING

(71) Applicant: Rakuten Symphony, Inc., Tokyo (JP)

(72) Inventors: Dharmendra Kumar Jain, Indore (IN); Vishal Parashar, Indore (IN); Priyank Kasera, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 0 days.

(21) Appl. No.: 17/996,123

(22) PCT Filed: Jul. 28, 2022

(86) PCT No.: PCT/US2022/038636
§ 371 (c)(1),
(2) Date: Oct. 13, 2022

(87) PCT Pub. No.: WO2024/025532
PCT Pub. Date: Feb. 1, 2024

(65) Prior Publication Data
US 2025/0094547 A1     Mar. 20, 2025

(51) Int. Cl.
*G06F 21/31* (2013.01)
(52) U.S. Cl.
CPC .................................. *G06F 21/31* (2013.01)
(58) Field of Classification Search
CPC ... G06F 21/31; G06F 3/1454; H04L 63/0838; H04L 63/108; H04L 67/02; H04L 67/10; H04L 67/55; H04L 65/4015; H04L 65/403; G06Q 10/101; G09G 2358/00
See application file for complete search history.

(56) References Cited

U.S. PATENT DOCUMENTS

| | | | |
|---|---|---|---|
| 6,493,760 B1 * | 12/2002 | Pendlebury | H04L 67/63 709/219 |
| 9,729,746 B1 * | 8/2017 | Hong | G06F 3/1288 |
| 10,474,416 B1 * | 11/2019 | Farivar | H04L 65/4015 |
| 10,757,258 B1 * | 8/2020 | Hardebeck | H04L 65/1076 |
| 11,063,762 B1 * | 7/2021 | Makarskyy | G06F 9/547 |
| 11,171,964 B1 * | 11/2021 | Huang | G06F 21/33 |
| 11,223,957 B1 * | 1/2022 | Mouton | H04W 12/48 |
| 11,290,687 B1 * | 3/2022 | Becchetti | H04N 7/15 |
| 11,522,934 B1 * | 12/2022 | Garcia Mendoza Sanchez | H04L 65/403 |
| 11,553,011 B1 * | 1/2023 | Zhang | H04L 65/1076 |
| 12,183,099 B2 * | 12/2024 | Sarin | G06V 20/80 |
| 12,185,391 B2 * | 12/2024 | Alexander | G06F 21/50 |

(Continued)

OTHER PUBLICATIONS

International Search Report dated Oct. 19, 2022 issued by the International Searching Authority in Application No. PCT/US 22/38636.

(Continued)

*Primary Examiner* — Aravind K Moorthy
(74) *Attorney, Agent, or Firm* — Sughrue Mion, PLLC (57) ABSTRACT

A method of screen sharing include receiving, by a first server device and from a user device, device information corresponding to the user device, generating, by the first server device, a device identifier (ID) based on the device information, receiving, by the first server device and from the user device, a request for a token, generating, by the first server device, a token based on the device ID, and sending, by the first server device, the token to the user device.

14 Claims, 10 Drawing Sheets

(56) References Cited

U.S. PATENT DOCUMENTS

| | | | |
|---|---|---|---|
| 2006/0031779 A1* | 2/2006 | Theurer | G06F 3/1454 715/781 |
| 2006/0053196 A1* | 3/2006 | Spataro | H04L 65/403 709/205 |
| 2006/0195495 A1* | 8/2006 | Asano | H04L 67/125 708/111 |
| 2008/0115073 A1* | 5/2008 | Erickson | G09G 5/14 715/766 |
| 2011/0099612 A1* | 4/2011 | Lee | H04L 51/48 726/6 |
| 2011/0126130 A1* | 5/2011 | Lieb | G06F 3/1454 715/753 |
| 2013/0019297 A1* | 1/2013 | Lawson | H04L 67/02 726/7 |
| 2013/0185784 A1* | 7/2013 | Tamura | H04L 63/0815 726/9 |
| 2013/0191929 A1* | 7/2013 | Yin | H04L 63/102 726/28 |
| 2013/0332727 A1* | 12/2013 | Jaudon | G06F 21/33 713/159 |
| 2013/0339731 A1* | 12/2013 | Rowles | H04L 63/0807 713/168 |
| 2014/0044123 A1* | 2/2014 | Lawson | H04L 63/0807 370/352 |
| 2014/0053182 A1* | 2/2014 | Jaager | H04N 21/632 725/25 |
| 2014/0086105 A1* | 3/2014 | Kang | H04L 67/55 370/259 |
| 2014/0126708 A1* | 5/2014 | Sayko | H04M 3/5166 379/93.01 |
| 2014/0229289 A1* | 8/2014 | Rao | G06Q 30/0269 705/14.66 |
| 2015/0067072 A1* | 3/2015 | Yin | H04L 51/23 709/206 |
| 2015/0310194 A1* | 10/2015 | Zhang | G06F 21/31 726/9 |
| 2016/0099984 A1* | 4/2016 | Karagiannis | H04L 12/1822 709/204 |
| 2017/0063836 A1* | 3/2017 | Cui | H04L 63/0884 |
| 2017/0070499 A1 | 3/2017 | Sweet et al. | |
| 2017/0140658 A1* | 5/2017 | Aluvala | H04W 76/14 |
| 2017/0163726 A1* | 6/2017 | Compton | G06F 11/2069 |
| 2017/0195460 A1* | 7/2017 | Biswas | H04L 63/0861 |
| 2017/0250812 A1* | 8/2017 | Schefenacker | H04L 9/14 |
| 2017/0289276 A1* | 10/2017 | Nagasaki | H04L 67/10 |
| 2017/0300286 A1* | 10/2017 | Lieb | G06F 3/1454 |
| 2017/0346804 A1* | 11/2017 | Beecham | H04L 9/3236 |
| 2017/0366547 A1* | 12/2017 | Goldfarb | H04L 63/10 |
| 2017/0374078 A1* | 12/2017 | Hakata | H04L 63/104 |
| 2018/0025148 A1* | 1/2018 | Jain | H04L 9/3234 713/166 |
| 2018/0234471 A1* | 8/2018 | Qian | H04L 43/0811 |
| 2018/0276618 A1* | 9/2018 | Nichani | G06Q 10/1053 |
| 2018/0302221 A1* | 10/2018 | Lu | H04L 9/3213 |
| 2018/0337924 A1* | 11/2018 | Graham | H04L 63/0884 |
| 2018/0352303 A1* | 12/2018 | Siddique | H04L 65/1069 |
| 2019/0089693 A1* | 3/2019 | Ding | G06F 21/44 |
| 2019/0089760 A1* | 3/2019 | Zhang | H04L 65/70 |
| 2019/0182113 A1* | 6/2019 | Alam | H04L 43/16 |
| 2019/0199719 A1* | 6/2019 | Uzun | H04W 12/06 |
| 2019/0327223 A1* | 10/2019 | Kumar | H04L 63/0853 |
| 2020/0059881 A1* | 2/2020 | Gupta | H04W 12/009 |
| 2020/0128210 A1* | 4/2020 | Hatada | H04N 7/147 |
| 2020/0228611 A1* | 7/2020 | McDonald | H04L 67/142 |
| 2020/0236152 A1* | 7/2020 | Bradley | H04N 21/482 |
| 2020/0372140 A1* | 11/2020 | Jaber | G06F 21/31 |
| 2021/0019723 A1* | 1/2021 | Karns | G06Q 20/201 |
| 2021/0044965 A1* | 2/2021 | Nambisan | H04W 12/63 |
| 2021/0127261 A1* | 4/2021 | Helms | H04W 12/084 |
| 2021/0141586 A1* | 5/2021 | Muthukrishnan | G06F 3/1462 |
| 2021/0272373 A1 | 9/2021 | Fradet et al. | |
| 2021/0288829 A1* | 9/2021 | Zhang | G06F 3/1454 |
| 2021/0306169 A1* | 9/2021 | Scifres | G06F 21/31 |
| 2021/0352064 A1* | 11/2021 | Tsarfati | H04L 63/1416 |
| 2021/0392136 A1* | 12/2021 | Modi | H04L 9/3234 |
| 2022/0006800 A1* | 1/2022 | Duchastel | H04L 63/083 |
| 2022/0014528 A1* | 1/2022 | Gambhir | H04L 63/104 |
| 2022/0020032 A1 | 1/2022 | Kim | |
| 2022/0060524 A1* | 2/2022 | Hanai | H04L 65/4025 |
| 2022/0114249 A1* | 4/2022 | Grancharov | G06F 21/53 |
| 2022/0131926 A1* | 4/2022 | Keum | H04L 67/55 |
| 2022/0138283 A1* | 5/2022 | Kolev | H04L 63/10 726/26 |
| 2022/0148078 A1* | 5/2022 | Kim | G06Q 40/02 |
| 2022/0174493 A1* | 6/2022 | Elsins | H04L 63/108 |
| 2022/0198538 A1* | 6/2022 | Francis | G06Q 30/0635 |
| 2022/0200999 A1 | 6/2022 | Huang et al. | |
| 2022/0209976 A1* | 6/2022 | Martin | H04L 63/102 |
| 2022/0210207 A1* | 6/2022 | Martin | H04L 65/1093 |
| 2022/0272420 A1* | 8/2022 | Tucker | H04N 21/64738 |
| 2022/0277367 A1* | 9/2022 | Takeichi | G06Q 10/083 |
| 2022/0353079 A1* | 11/2022 | Etwaru | G06T 1/20 |
| 2022/0400014 A1* | 12/2022 | Mori | G06F 3/1289 |
| 2022/0400108 A1* | 12/2022 | Rafferty | H04L 63/0853 |
| 2022/0405731 A1* | 12/2022 | Wielard | G06Q 20/3223 |
| 2023/0141966 A1* | 5/2023 | Weeden | G06F 21/629 713/185 |
| 2023/0156051 A1* | 5/2023 | Zhang | G06Q 10/10 709/204 |
| 2023/0171255 A1* | 6/2023 | Kuravangi-Thammaiah | H04W 12/084 |
| 2023/0198769 A1* | 6/2023 | Parsons Freund | H04L 9/40 713/168 |
| 2023/0208895 A1* | 6/2023 | Crumley | G06F 3/04842 709/231 |
| 2023/0216816 A1* | 7/2023 | Fong | G06Q 10/00 709/224 |
| 2023/0216947 A1* | 7/2023 | Bernardi | H04L 67/10 713/150 |
| 2023/0254164 A1* | 8/2023 | Sampath | G09C 5/00 713/168 |
| 2023/0281595 A1* | 9/2023 | Ober | G06Q 20/3274 705/21 |
| 2023/0342481 A1* | 10/2023 | Nikoghossian | G06F 21/62 |
| 2023/0394163 A1* | 12/2023 | Xing | G06F 16/285 |
| 2023/0403266 A1* | 12/2023 | Cui | G06F 9/452 |
| 2024/0007463 A1* | 1/2024 | Gormley | H04L 63/0853 |

OTHER PUBLICATIONS

Written Opinion dated Oct. 19, 2022 issued by the International Searching Authority in Application No. PCT/US 22/38636.

\* cited by examiner

SECURE TOKEN FOR SCREEN SHARING

CROSS REFERENCE TO RELATED APPLICATIONS

This application is a National Stage of International Application No. PCT/US2022/038636 filed Jul. 28, 2022.

BACKGROUND

1. Field

Apparatuses and methods consistent with example embodiments of the present disclosure relate to screen sharing applications using secure tokens.

2. Description of Related Art

In a screen sharing application where a user device shares a screen with an external device (e.g., a server device), information is typically exchanged in order to facilitate the connection and generate a screen sharing session between the user device and the external device. The information exchanged may include a device identifier (ID) or other information/keys that are unique to the user device. If the device ID or unique information/keys are exposed during the screen sharing session, they may be subsequently used to track the user device.

SUMMARY

According to embodiments, systems and methods are provided for secure screen sharing between devices.

According to an aspect of the disclosure, a method of screen sharing may include receiving, by a first server device and from a user device, device information corresponding to the user device, generating, by the first server device, a device identifier (ID) based on the device information, receiving, by the first server device and from the user device, a request for a token, generating, by the first server device, a token based on the device ID, and sending, by the first server device, the token to the user device.

According to an aspect of the disclosure, a system for screen sharing may include a user device, and a first server device configured to receive, from the user device, device information corresponding to the user device, generate a device ID based on the device information, receive, from the user device, a request for a token, generate a token based on the device ID, and send the token to the user device.

According to an aspect of the disclosure, a non-transitory computer-readable storage medium may store instructions that, when executed by at least one processor, cause the at least one processor to receive, by a first server device and from a user device, device information corresponding to the user device, generate, by the first server device, a device ID based on the device information, receive, by the first server device and from the user device, a request for a token, generate, by the first server device, a token based on the device ID, and send, by the first server device, the token to the user device.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise.

Furthermore, expressions such as "at least one of [A] and [B]" or "at least one of [A] or [B]" are to be understood as including only A, only B, or both A and B.

Figure 1:
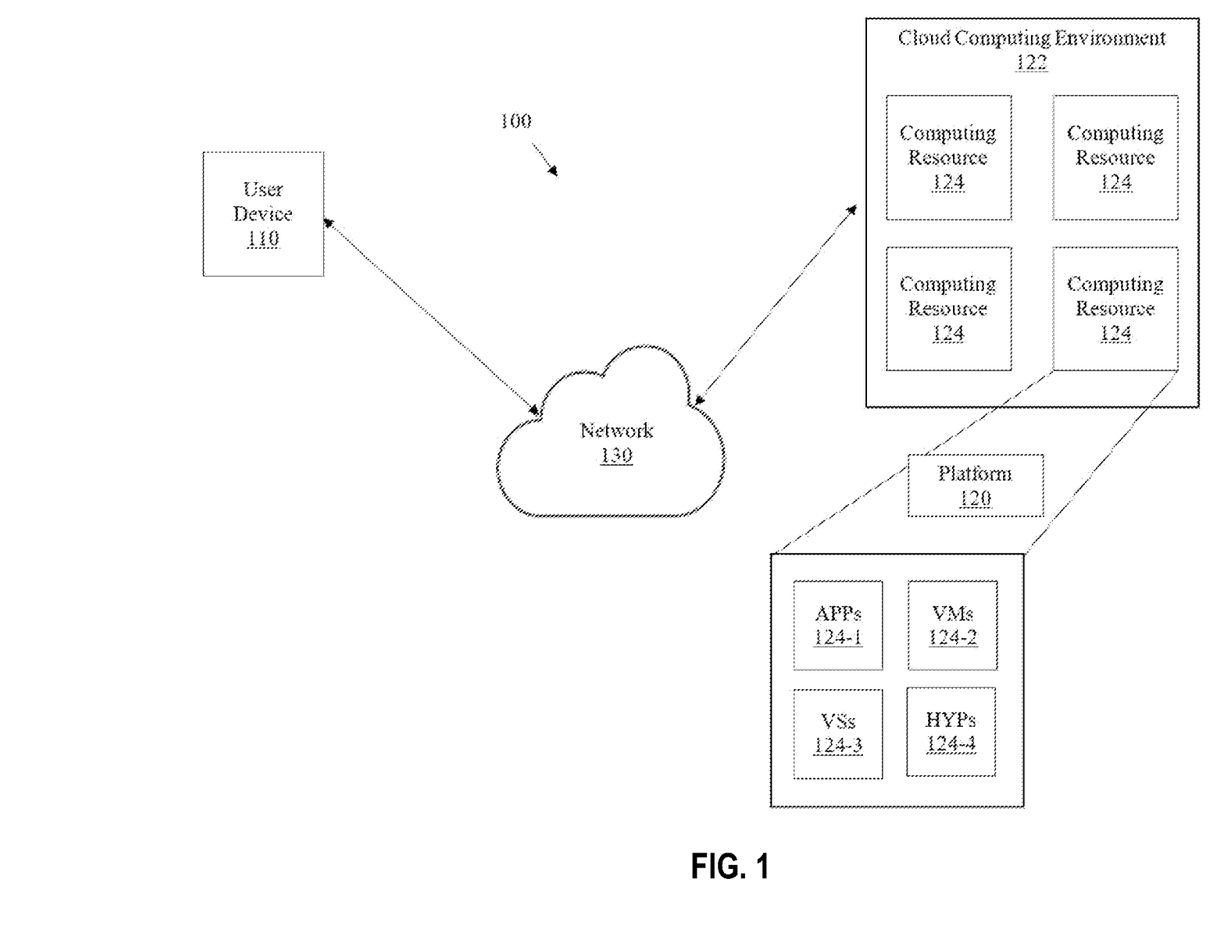
FIG. 1 is a diagram of an example environment in which systems and/or methods, described herein, may be implemented.

FIG. 1 is a diagram of an example environment 100 in which systems and/or methods, described herein, may be implemented. As shown in FIG. 1, environment 100 may include a user device 110, a platform 120, and a network 130. Devices of environment 100 may interconnect via wired connections, wireless connections, or a combination of wired and wireless connections. In embodiments, any of the functions and operations described with reference to FIG. 1 above may be performed by any combination of elements illustrated in FIG. 1.

User device 110 includes one or more devices capable of receiving, generating, storing, processing, and/or providing information associated with platform 120. For example, user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 110 may receive information from and/or transmit information to platform 120.

Platform 120 includes one or more devices capable of receiving, generating, storing, processing, and/or providing information. In some implementations, platform 120 may include a cloud server or a group of cloud servers. In some implementations, platform 120 may be designed to be modular such that certain software components may be swapped in or out depending on a particular need. As such, platform 120 may be easily and/or quickly reconfigured for different uses.

In some implementations, as shown, platform 120 may be hosted in cloud computing environment 122. Notably, while implementations described herein describe platform 120 as being hosted in cloud computing environment 122, in some implementations, platform 120 may not be cloud-based (i.e., may be implemented outside of a cloud computing environment) or may be partially cloud-based.

Cloud computing environment 122 includes an environment that hosts platform 120. Cloud computing environment 122 may provide computation, software, data access, storage, etc. services that do not require end-user (e.g., user device 110) knowledge of a physical location and configuration of system(s) and/or device(s) that hosts platform 120. As shown, cloud computing environment 122 may include a group of computing resources 124 (referred to collectively as "computing resources 124" and individually as "computing resource 124").

Computing resource 124 includes one or more personal computers, a cluster of computing devices, workstation computers, server devices, or other types of computation and/or communication devices. In some implementations, computing resource 124 may host platform 120. The cloud resources may include compute instances executing in computing resource 124, storage devices provided in computing resource 124, data transfer devices provided by computing resource 124, etc. In some implementations, computing resource 124 may communicate with other computing resources 124 via wired connections, wireless connections, or a combination of wired and wireless connections.

As further shown in FIG. 1, computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

Application 124-1 includes one or more software applications that may be provided to or accessed by user device 110. Application 124-1 may eliminate a need to install and execute the software applications on user device 110. For example, application 124-1 may include software associated with platform 120 and/or any other software capable of being provided via cloud computing environment 122. In some implementations, one application 124-1 may send/receive information to/from one or more other applications 124-1, via virtual machine 124-2.

Virtual machine 124-2 includes a software implementation of a machine (e.g., a computer) that executes programs like a physical machine. Virtual machine 124-2 may be either a system virtual machine or a process virtual machine, depending upon use and degree of correspondence to any real machine by virtual machine 124-2. A system virtual machine may provide a complete system platform that supports execution of a complete operating system ("OS"). A process virtual machine may execute a single program, and may support a single process. In some implementations, virtual machine 124-2 may execute on behalf of a user (e.g., user device 110), and may manage infrastructure of cloud computing environment 122, such as data management, synchronization, or long-duration data transfers.

Virtualized storage 124-3 includes one or more storage systems and/or one or more devices that use virtualization techniques within the storage systems or devices of computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 124-4 may provide hardware virtualization techniques that allow multiple operating systems (e.g., "guest operating systems") to execute concurrently on a host computer, such as computing resource 124. Hypervisor 124-4 may present a virtual operating platform to the guest operating systems, and may manage the execution of the guest operating systems. Multiple instances of a variety of operating systems may share virtualized hardware resources.

Network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
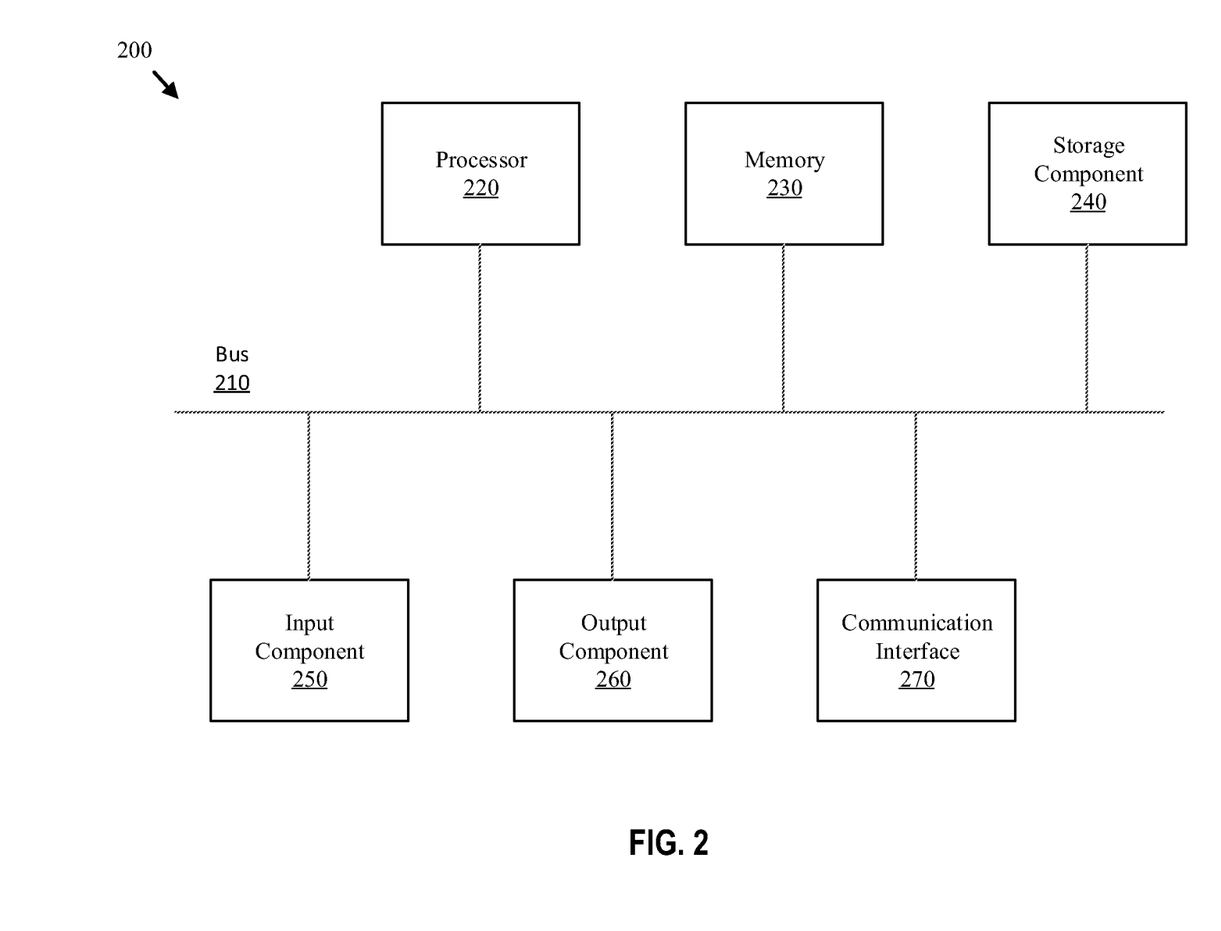
FIG. 2 is a diagram of example components of a device according to an embodiment.

FIG. 2 is a diagram of example components of a device 200. Device 200 may correspond to user device 110 and/or platform 120. As shown in FIG. 2, device 200 may include a bus 210, a processor 220, a memory 230, a storage component 240, an input component 250, an output component 260, and a communication interface 270.

Bus 210 includes a component that permits communication among the components of device 200. Processor 220 may be implemented in hardware, firmware, or a combination of hardware and software. Processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 220 includes one or more processors capable of being programmed to perform a function. Memory 230 includes a random access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of device 200. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 250 includes a component that permits device 200 to receive information, such as via user input (e.g., a touch screen display, a keyboard, a keypad, a mouse, a button, a switch, and/or a microphone). Additionally, or alternatively, input component 250 may include a sensor for sensing information (e.g., a global positioning system (GPS) component, an accelerometer, a gyroscope, and/or an actuator). Output component 260 includes a component that provides output information from device 200 (e.g., a display, a speaker, and/or one or more light-emitting diodes (LEDs)).

Communication interface 270 includes a transceiver-like component (e.g., a transceiver and/or a separate receiver and transmitter) that enables device 200 to communicate with other devices, such as via a wired connection, a wireless connection, or a combination of wired and wireless connections. Communication interface 270 may permit device 200 to receive information from another device and/or provide information to another device. For example, communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

Device 200 may perform one or more processes described herein. Device 200 may perform these processes in response to processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices.

Software instructions may be read into memory 230 and/or storage component 240 from another computer-readable medium or from another device via communication interface 270. When executed, software instructions stored in memory 230 and/or storage component 240 may cause processor 220 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

In screen sharing applications, a device identifier (ID) or a unique key such as an Android ID, international mobile equipment identity (IMEI), international mobile subscriber identity (IMSI), etc., may be used for establishing a connection. However, as this information is unique, the information may be used to track the device outside of the screen sharing session. Thus, provided are a system and method for screen sharing (i.e., implementation of a screen sharing application) using a token to identify a user of a user device. The token may be of a predetermined number of digits (e.g., 6) and may be generated based on the device ID, unique ID information of the device, etc. The token may have a set validity time period (e.g., 10 minutes) during which the token may be used to start a screen sharing session.

The system may include a user device that includes the screen which is to be shared, a first server device configured to generate tokens, and a second server device with which the user device communicates to utilize the screen sharing application (i.e., the user device shares the screen with the second server device). The first server device (e.g., a communication platform), may receive device and application information from the user device, and then generate a device ID based on the received information (e.g., the IMEI, IMSI, Android ID, other information unique to the user device, etc.). The first server device may receive a request to generate a token for a screen sharing session from the user device, and then may generate the token based on the device ID and send the token to the user device. To start the screen sharing session, the user device may send the token to the second server device. Since the unique information of the user device is only sent to the first server device and not the second server device (i.e., the unique information is not obtained during a screen sharing session with the second server device), the risk of the user device being tracked based on the unique information outside of the screen sharing session is reduced.

The first server device may store the generated device ID in an encrypted storage device to further increase security, and the device ID may also be encrypted. The first server device may generate the token based on a random number generation process. Furthermore, the first server device may generate the token based on the device ID, unique device information, etc. The first server device may, after generating the token, determine whether the token is unique. That is, the first server device may determine whether the generated token is currently in use with other screen sharing sessions, or has been generated, not in current use, but still valid within the set validity time period. When the first server device determines that the generated token is not unique, the first server device may generate a subsequent token. The first server device may set a validity time period for the generated token. The validity time period may correspond to a time period in which the token is valid to be submitted for starting a screen sharing session. The validity time period may be determined based on a predetermined time period (e.g., 10 minutes). The validity time period may vary based on a number of tokens that are currently generated (e.g., the greater number of currently generated tokens, the shorter the validity time period or vice versa). Furthermore, a session ID for a screen sharing session between the user device and the second server device may be generated based on the generated token.

Figure 3A:
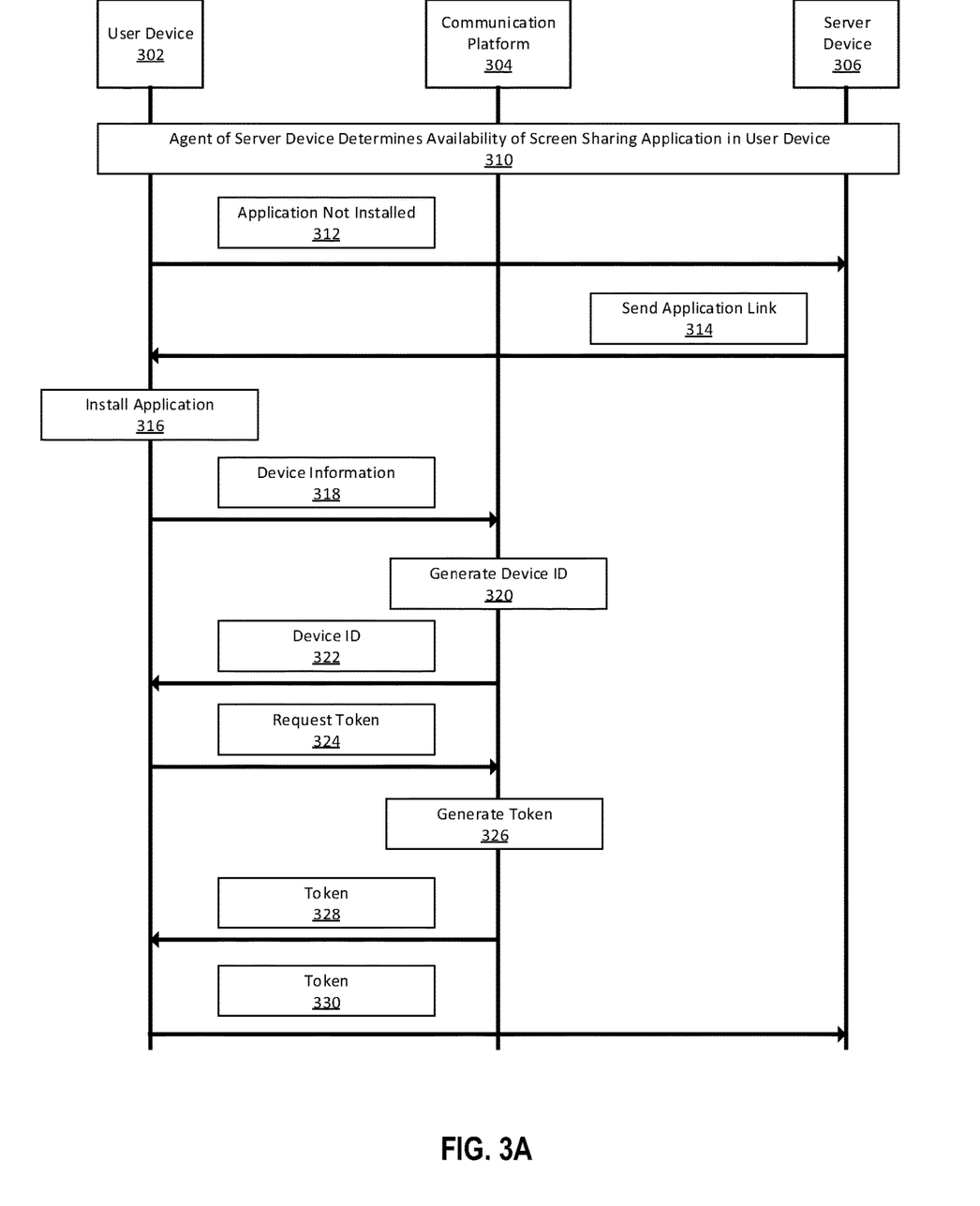
FIGS. 3A and 3B are diagrams of an operation flow for a screen sharing application, according to an embodiment.
Figure 3B:
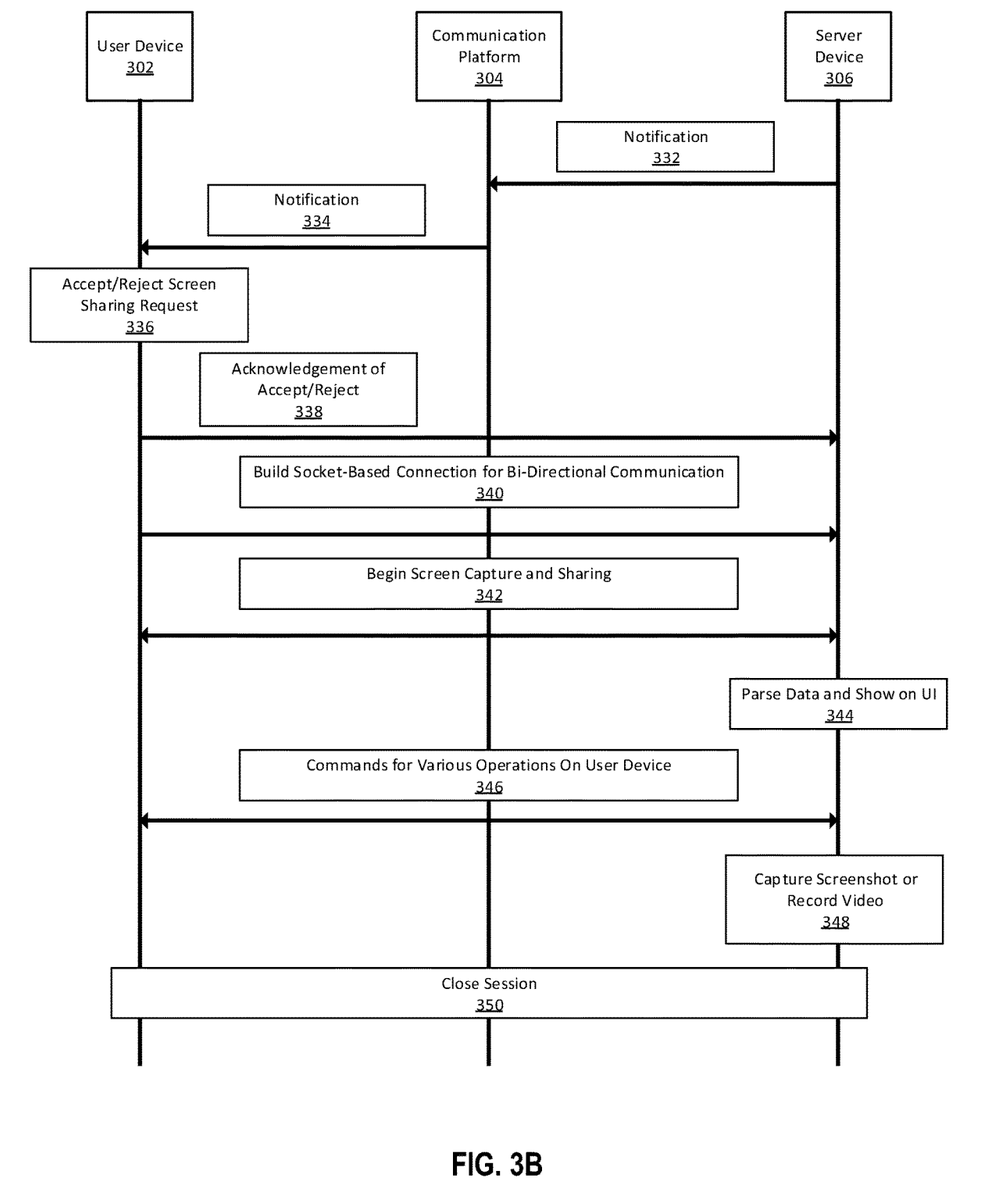

FIGS. 3A and 3B are diagrams of an operation flow for a screen sharing application, according to an embodiment. The system in FIGS. 3A and 3B includes a user device 302, a communication platform 304 (e.g., a first server device), and a server device 306 (e.g., a second server device). In operation 310, an agent of the server device 306 may determine the availability of a screen sharing application in the user device 302. In operation 312, the user device 302 may send a notification to the server device that the application is not installed (i.e., when the user device 302 does not have the application installed). In operation 314, the server device 306 may send an application download link to the user device 302 such that the user device 302 may install the screen sharing application. In operation 316, the user device 302 may install the screen sharing application.

In operation 318, the user device 302 may send device information (e.g., IMEI, IMSI, Android ID, etc.) and/or application information to the communication platform 304. In operation 320, the communication platform 304 may generate a device ID based on the device information/application information. In operation 322, the communication platform 304 may send the device ID to the user device 302. In operation 324, the user device 302 may send a request to the communication platform 304 to generate a token for the screen sharing application. In operation 326, the communication platform 304 may generate the token. In operation 328, the communication platform 304 may send the token to the user device 302. In operation 330, the user device 302 may send the token to the server device 306 for stating a screen sharing session in the screen sharing application.

In operation 332, the server device 306 may send a notification to the communication platform 304 that the token has been confirmed. In operation 334, the communication platform 304 may send the notification that the token has been confirmed to the user device 302. Alternatively, the server device 306 may send the notification that the token has been confirmed directly to the user device 302. In operation 336, the user device 302 may accept or reject a screen sharing request. In operation 338, the user device 302 may send to the server device 306 an acknowledgement of the accept/reject status.

Operations 340-350 are performed when the screen sharing request is accepted. In operation 340, the system may build a socket based-connection between the user device 302 and the server device 306 for bi-directional communication. In operation 342, the system may begin the screen sharing/capture. That is, the server device 306 begins to capture the screen of the user device 302. In operation 344, the server device 306 may parse data and show data on a user interface (UI) of the server device 306. In operation 346, the server device 306 may perform various commands for various operations on the user device 302. For example, the server device 306 may perform annotations through an interface of the server device 302 to be duplicated on the screen of the user device 302, may draw pointer and indications to be duplicated on the screen of the user device 302, may change video/image quality of the shared screen on a UI of the server device 306, etc. In operation 348, the server device 306 may capture screenshots of the shared screen and/or record video of the shared screen. In operation 350, the system may close the session when either the server device 306 or the user device 302 opts to terminate the screen sharing session.

Figure 4:
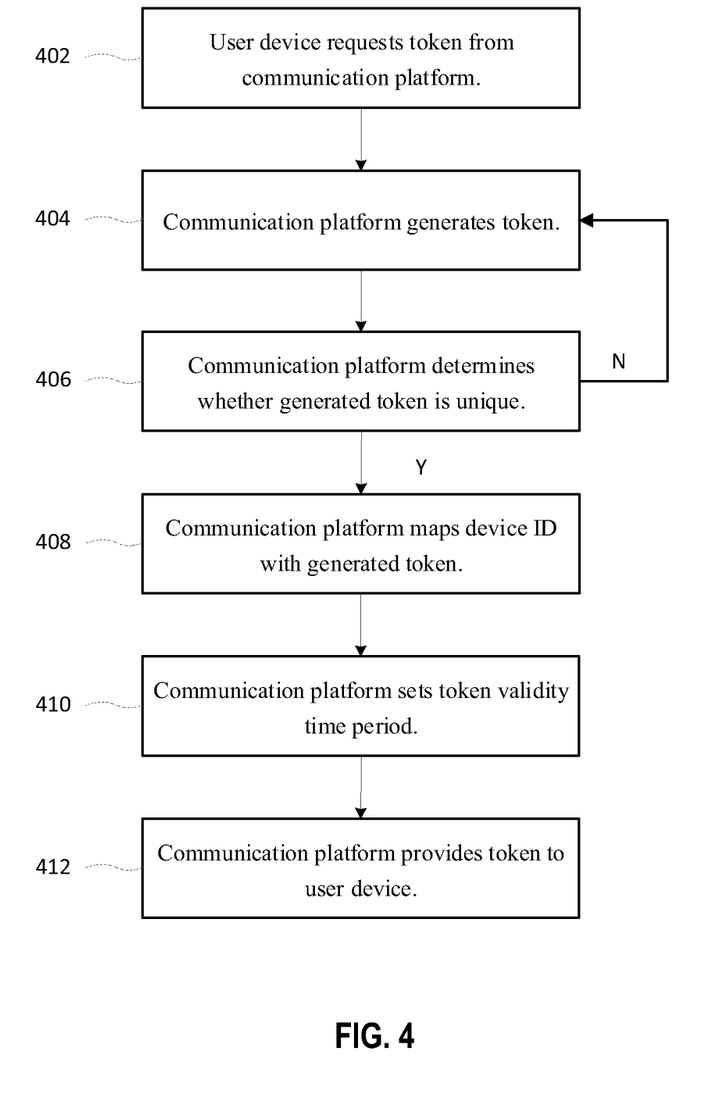
FIG. 4 is a flowchart of a method of generating a token, according to an embodiment.

FIG. 4 is a flowchart of a method of generating a token, according to an embodiment. In operation 402, a user device may request a token from a communication platform (e.g., a first server device). In operation 404, the communication platform may generate a token based on, for example, a device ID, device information, etc. In operation 406, the communication platform may determine whether the token is unique. That is, the communication platform may determine whether the token is unique compared to currently in-use tokens for other screen sharing sessions, compared to generated token that are still within their respective validity time periods, etc. If the token is not unique, then the system repeats operation 404. If the token is unique, in operation 408, the communication platform may map the device ID with the generated token. In operation 410, the communication platform may set a token validity time period. In operation 412, the communication platform may provide the token to the user device.

Figure 5A:
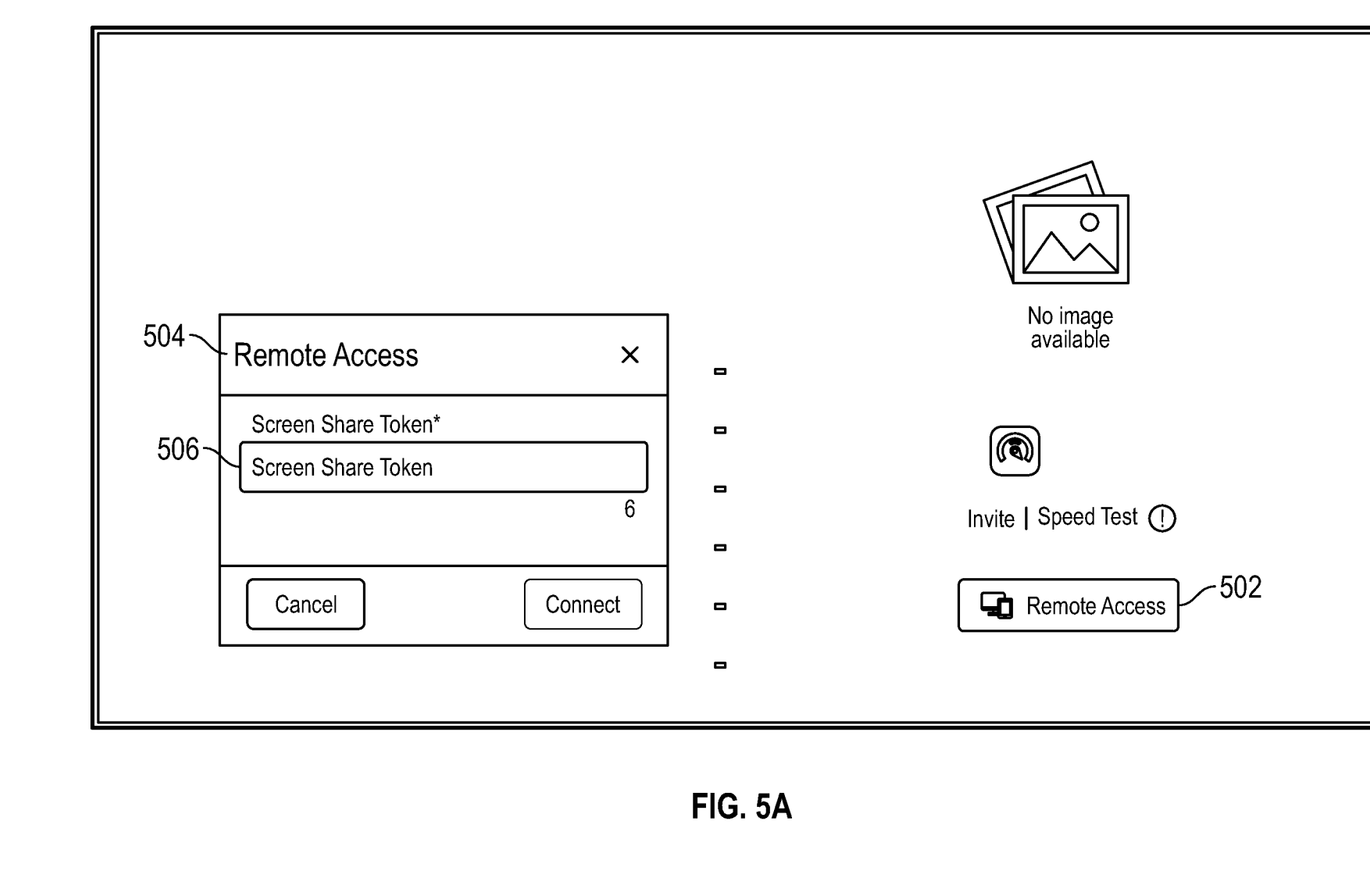
FIGS. 5A, 5B, 5C, and 5D are diagrams of a user interface (UI) on a server device on which a screen sharing application operates, according to an embodiment.
Figure 5B:
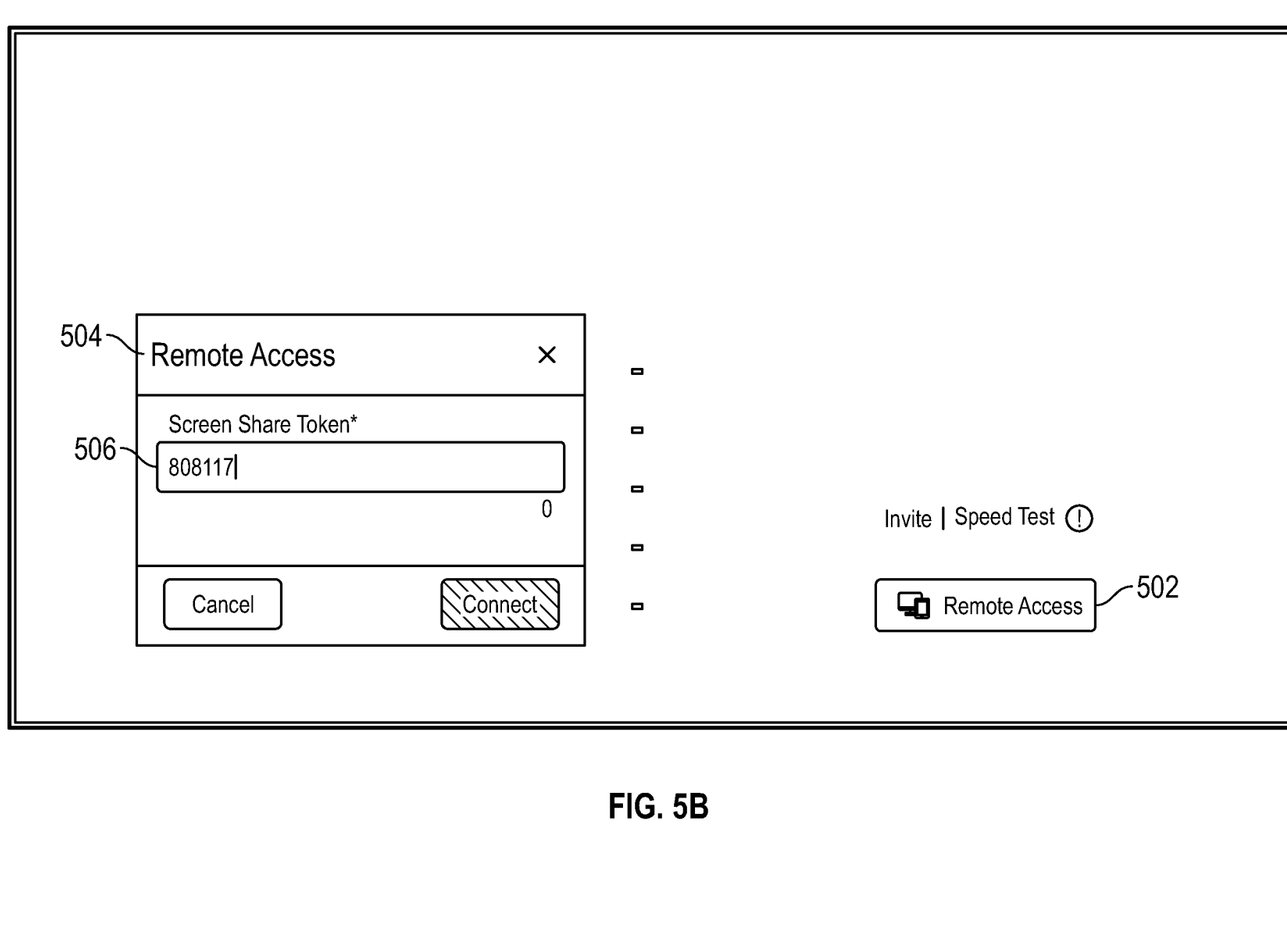

FIGS. 5A-5D are diagrams of a UI on a server device (i.e., a second device) on which a screen sharing application operates, according to an embodiment. Referring to FIG. 5A, a user of the server device may select the remote access button 502 to start a screen sharing session with a user device, and a remote access confirmation window 504 may be displayed with a field 506 for entering the token. Referring to FIG. 5B, the user of the server device may receive the token (shown as "808117" as an example) from the user device, and the token may be automatically populated in the field 506 or may be manually entered in the field 506 by the user of the server device. Once the token is entered, the user of the server device may start the screen sharing session.

Figure 5C:
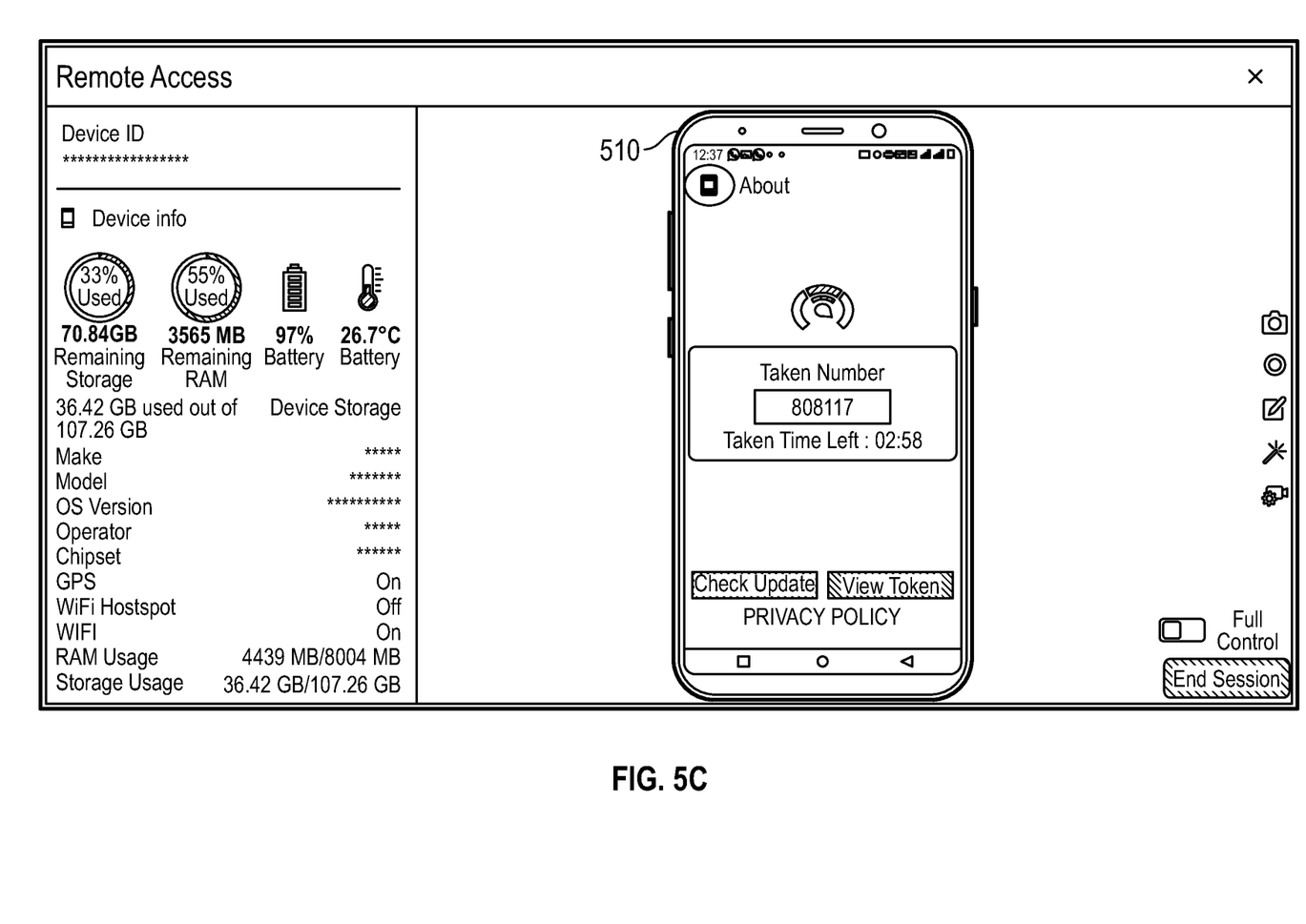
Figure 5D:
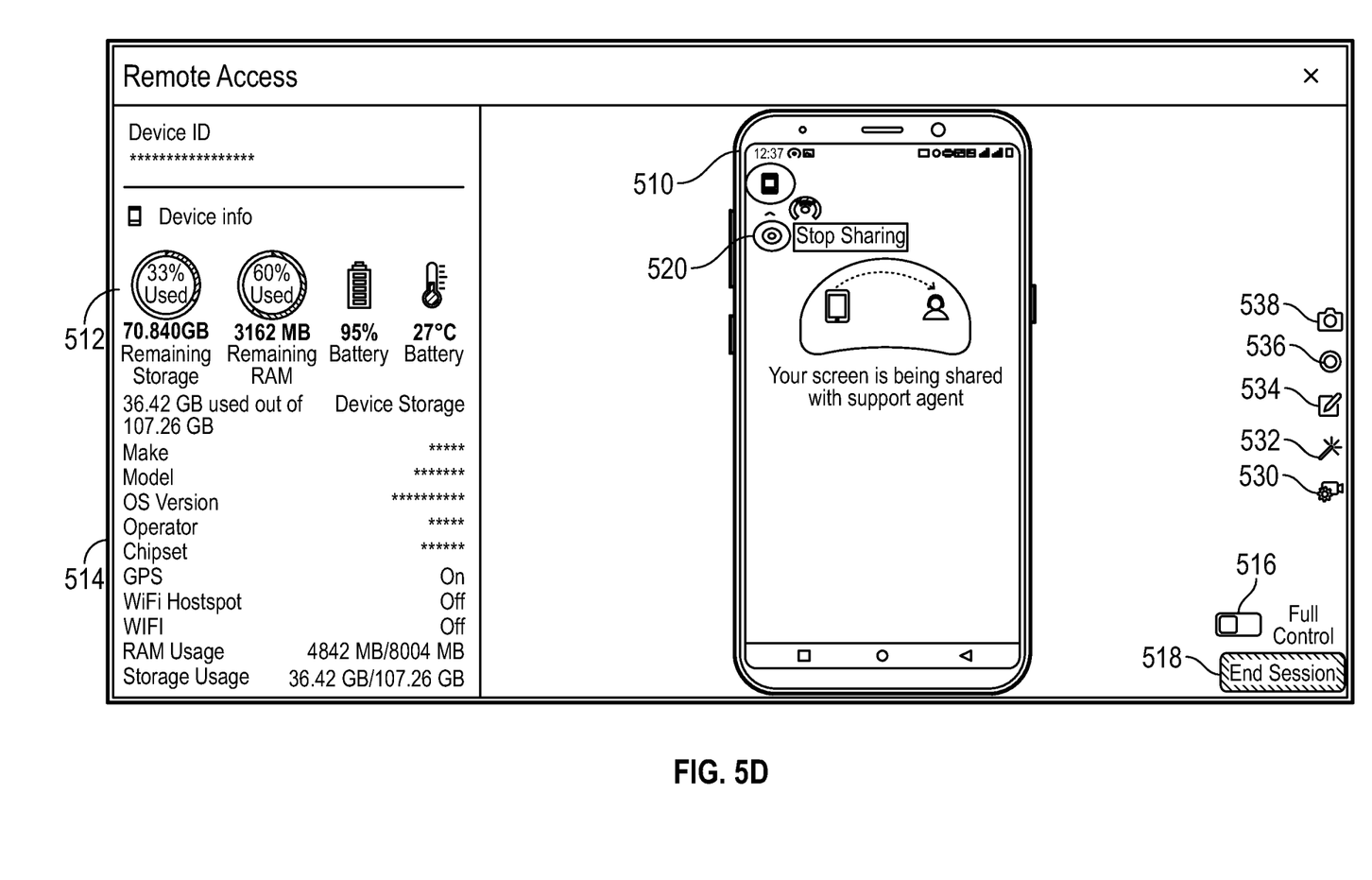

Referring to FIG. 5C, the screen 510 of the user device is shown, where the token has been previously entered by a user of the user device. Referring to FIG. 5D, the UI may include current device statistics 512, including remaining storage, remaining memory, remaining battery, battery temperature, etc. The UI may include device hardware information, such as the make, model, operating system (OS) version, operator, chipset, global positioning system (GPS), Wi-Fi hotspot and Wi-Fi activation status, random access memory (RAM) usage, storage usage, etc. The UI may include a control slide 516 that allows the user of the server device to fully control the screen 510 of the user device. That is, when full control is off, the user of the server device cannot interact with applications and other functions of the user device, but rather can only provide annotations and drawing directions to the user of the user device. When full control is on, the user of the server device may interact with applications and functions of the user device. The UI may include a session termination button 518, and the user device may also include a session termination icon 520. The user of the server device may change the video quality of the screen sharing via icon 530, may provide pointers to the screen of the user device via icon 532, may draw shapes or provide annotations to the screen of the user device via icon 534, may record video of the screen sharing session via icon 536, and may take a screenshot of the screen sharing session via icon 538.

Figure 6:
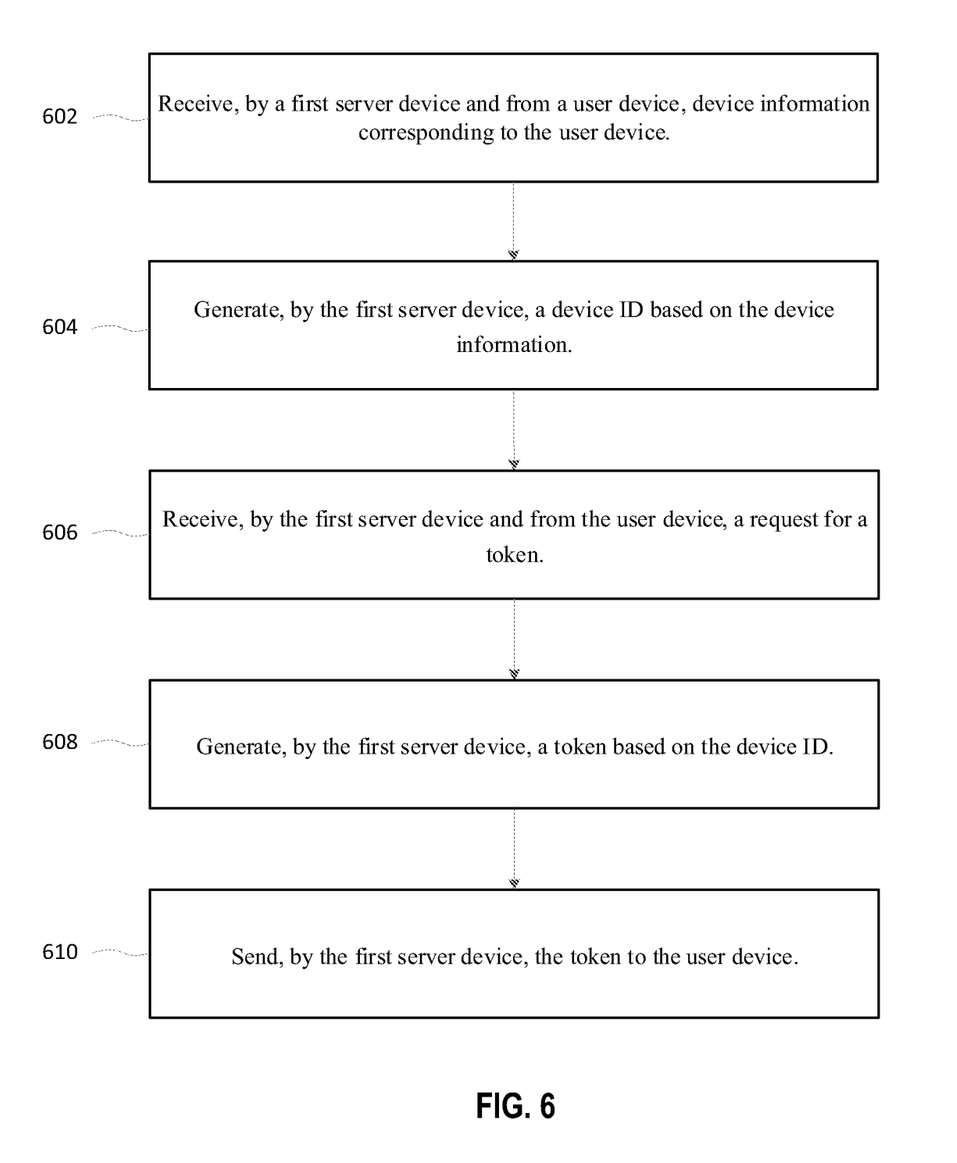
FIG. 6 is a flowchart of a method for session sharing, according to an embodiment.

FIG. 6 is a flowchart of a method for session sharing, according to an embodiment. In operation 602, the system may receive, by a first server device and from a user device, device information corresponding to the user device. In operation 604, the system may generate, by the first server device, a device ID based on the device information. In operation 606, the system may receive, by the first server device and from the user device, a request for a token. In operation 608, the system may generate, by the first server device, a token based on the device ID. In operation 610, the system may send, by the first server device, the token to the user device.

In embodiments, any one of the operations or processes of FIGS. 3A-6 may be implemented by or using any one of the elements illustrated in FIGS. 1 and 2.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of screen sharing, comprising:
    receiving, by a first server device and from a user device, device information corresponding to the user device;
    generating, by the first server device, a device identifier (ID) based on the device information;
    receiving, by the first server device and from the user device, a request for a token;
    generating, by the first server device, a token based on the device ID; and
    sending, by the first server device, the token to the user device;
    sending, by the user device, the generated token to a second server device;
    in response to receiving the generated token from the user device, sending, by the second server device and to the user device, a notification that the generated token has been confirmed; and
    in response to receiving the notification that the generated token has been confirmed, accepting, by the user device, a screen sharing request for sharing a screen of the user device with the second server device.

2. The method of claim 1, further comprising:
    determining, by the first server device, whether the generated token is unique from in-use tokens; and
    generating, by the first server device, a subsequent token when the previously generated token is determined to not be unique from in-use tokens.

3. The method of claim 1, further comprising setting, by the first server device, a validity time period for the token.

4. The method of claim 3, wherein the validity time period is set based on a predetermined time period.

5. The method of claim 1, further comprising mapping, by the first server device, the token to the device ID.

6. A system for screen sharing, comprising:
    a user device;
    a first server device configured to:
        receive, from the user device, device information corresponding to the user device;
        generate a device identifier (ID) based on the device information;
        receive, from the user device, a request for a token;
        generate a token based on the device ID; and
        send the token to the user device; and
    a second server device,
    wherein the user device is configured to send the generated token to the second server device,
    wherein the second server device is configured to, in response to receiving the generated token from the user device, send, to the user device, a notification that the generated token has been confirmed, and
    wherein the user device is further configured to, in response to receiving the notification that the generated token has been confirmed, accept, by the user device, a screen sharing request for sharing a screen of the user device with the second server device.

7. The system of claim 6, wherein the first server device is further configured to:
    determine whether the generated token is unique from in-use tokens; and
    generate a subsequent token when the previously generated token is determined to not be unique from in-use tokens.

8. The system of claim 6, wherein the first server device is further configured to set a validity time period for the token.

9. The system of claim 8, wherein the validity time period is set based on a predetermined time period.

10. The system of claim 6, wherein the first server device is further configured to map the token to the device ID.

11. A non-transitory computer-readable storage medium storing instructions that, when executed by at least one processor, cause the at least one processor to:
    receive, by a first server device and from a user device, device information corresponding to the user device;
    generate, by the first server device, a device identifier (ID) based on the device information;
    receive, by the first server device and from the user device, a request for a token;
    generate, by the first server device, a token based on the device ID;
    send, by the first server device, the token to the user device;
    send, by the user device, the generated token to a second server device;
    in response to receiving the generated token from the user device, send, by the second server device and to the user device, a notification that the generated token has been confirmed; and
    in response to receiving the notification that the generated token has been confirmed, accept, by the user device, a screen sharing request for sharing a screen of the user device with the second server device.

12. The storage medium of claim 11, wherein the instructions, when executed, further cause the at least one processor to:
    determine, by the first server device, whether the generated token is unique from in-use tokens; and
    generate, by the first server device, a subsequent token when the previously generated token is determined to not be unique from in-use tokens.

13. The storage medium of claim 11, wherein the instructions, when executed, further cause the at least one processor to set, by the first server device, a validity time period for the token.

14. The storage medium of claim 13, wherein the validity time period is set based on a predetermined time period.

* * * * *